Oct. 14, 1941.   M. W. BALDWIN, JR   2,259,284
SWEEP CIRCUITS
Filed Aug. 26, 1937
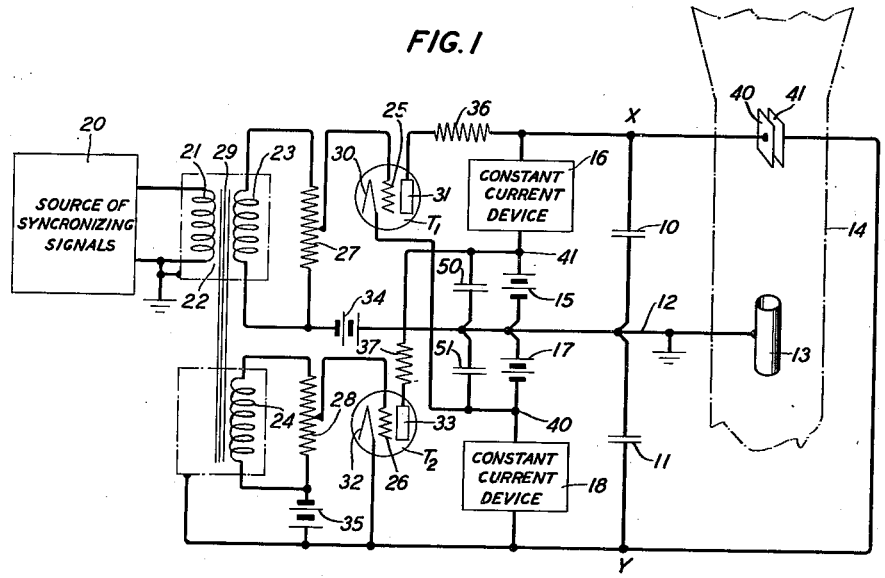
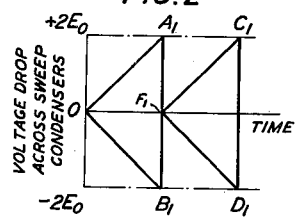
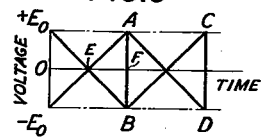
INVENTOR
M. W. BALDWIN, JR.
BY
C. A. Sprague
ATTORNEY Patented Oct. 14, 1941

2,259,284

UNITED STATES PATENT OFFICE 2,259,284

SWEEP CIRCUITS

Millard W. Baldwin, Jr., Glen Ridge, N. J., assignor to Bell Telephone Laboratories, Incorporated, New York, N. Y., a corporation of New York Application August 26, 1937, Serial No. 160,992

16 Claims. (Cl. 250—27)

This application relates to electric condenser charging and discharging circuits and more particularly to sweep circuits such as those used in television scanning.

In Patent 2,180,365 issued November 21, 1939 to F. R. Norton, there is disclosed a sweep circuit for generating saw-toothed voltage wave forms suitable for television scanning, which voltages are balanced with respect to the potential of an anode of a cathode ray tube. In this Norton circuit two sweep condensers in series with their common terminal connected to ground are charged through constant current devices substantially linearly with respect to time, these charges being suddenly removed when a pair of gas-filled grid controlled tubes are periodically and simultaneously discharged in accordance with the reception of synchronizing impulses. The sweep condensers are connected respectively to the plates of a pair of deflection plates in the cathode ray tube by means of coupling resistances and coupling condensers. Some coupling means are necessary in the Norton circuit because the voltage of the outside terminal of one of the sweep condensers is always positive with respect to that of the common terminal and that of the other outside terminal is always negative with respect thereto, while the voltages of the respective deflection plates of the cathode ray tube must swing between positive and negative values with respect to a fixed or neutral potential, that of the anode, if the beam is to be deflected on both sides of its neutral or rest position.

It is an object of this invention to provide an improved balanced sweep circuit in which the sweep condensers are directly coupled to the opposite plates of a pair of deflection plates in a cathode ray tube.

It is another object to provide a balanced sweep circuit having the advantage over the above-mentioned sweep circuit that the voltage of the source providing the charging current for the sweep condensers is reduced by a factor of two.

It is a further object of this invention to provide a sweep circuit in which a pair of sweep condensers connected in series with their common terminal fixed at ground or other potential have the charges thereon varied in such a manner that the potential of each outside terminal with respect to the fixed potential of the common terminal is alternately positive and negative, and the sum of the separate potential differences between each ungrounded terminal and ground is substantially zero at every instant.

In accordance with the invention, the common terminal of the two sweep condensers is maintained at the same reference potential. During a portion of the cycle the potential of the outside terminal of one condenser is caused to change substantially uniformly to more positive values by means of current from a suitable direct current source acting through an appropriate current limiting device, and the potential of the outside terminal of the second condenser is caused to change substantially uniformly and at the same rate to more negative values by means of current from a similar source acting through a current limiting device. Upon the reception of synchronizing impulses, two gas-filled grid controlled electron discharge devices become conducting and so establish momentary cross-connections between each outside condenser terminal and that one of the direct current sources which initially charges the opposite condenser, thereby reversing quickly the polarity of each of the outside condenser terminals, whereupon the discharge devices become non-conducting and the cycle is repeated. By suitably proportioning the circuit elements the potential of each condenser terminal with respect to ground or reference potential can be made to average substantially zero over the cycle. The output of each condenser may thus be made a substantially unbiased voltage wave. In the circuit described in the above-mentioned Norton patent it was found that it takes a matter of ten to fifteen seconds for the coupling condensers to become initially charged and the electron beam of the cathode ray tube is not, of course, deflected symmetrically until these condensers are charged. By eliminating the coupling condensers this disadvantage is avoided. Moreover, the coupling condensers are costly because of the requirement that their leakage be extremely low.

The invention will be more readily understood by referring to the following description taken in connection with the accompanying drawing forming a part thereof in which:

Fig. 1 shows a balanced sweep circuit involving this invention;

Fig. 2 shows the approximate wave shape for the sweep voltages in a previously known circuit; and Fig. 3 shows the approximate wave shape of the sweep voltages in the circuit of Fig. 1.

Referring to the drawing, Fig. 1 shows a balanced sweep circuit, which may be used, for example, as a suitable source to generate saw-tooth voltages to be applied preferably across one pair of deflecting plates in a cathode ray tube to be used in television scanning to cause deflection of the cathode ray beam in one direction, as, for example, in a horizontal direction. A similar circuit, differing only from this one in the value of the circuit constants, may be used to produce vertical deflection. This circuit comprises sweep condensers 10 and 11 having their common terminal 12 connected to ground and to the anode 13 of a cathode ray tube 14, with means for charging and discharging these condensers simultaneously.

Considering the voltage relations indicated in Fig. 3, and starting with the condition represented at point E, condenser 10 is slowly and linearly charged to a positive potential indicated by the point A, which will be designated potential $+E_0$, by means of the source of direct current 15, which may, for example, be 250 volts, acting through the constant current device 16.

Preferably the device 16 comprises a pentode having a cathode, an anode, a control grid, a screen grid and a suppressor grid, with these grids so connected with respect to the cathode and the anode that any decrease in voltage of the plate circuit of the device 16 caused by the changed charge on the condenser 10 tending to reduce the plate current will decrease the bias of one or more of the grids and tend to keep the current through the tube at a constant value. Thus the rate of charge of the condenser 10 tends to remain constant. For a more complete description of the method of operation of pentode tubes having feedback circuits on one or more of their grids to produce a constant current device for use in condenser charging or discharging circuits, reference may be made to Patent 2,180,364 issued November 21, 1939 to F. R. Norton.

In a similar manner the condenser 11 is charged by means of a source of direct current 17, which is similar to the direct current source 15, through a constant current device 18 which is similar to the constant current device 16. Thus, after a certain period of time, point Y will be placed at a potential in the negative direction represented by point B in Fig. 3, this potential being designated $-E_0$. Thus, after the period of time represented by the distance EF, Fig. 3, the potential difference between points X and Y reaches a value of $2E_0$.

A suitable circuit for suddenly reversing the charges on the condensers 10 and 11 at periodic intervals comprises a source of synchronizing signals or impulses 20 connected to the primary winding 21 of a transformer 22 which has two secondary windings 23 and 24 connmected respectively to the grids 25 and 26 of gas-filled grid-controlled electron discharge devices $T_1$ and $T_2$ through potentiometers 27 and 28.

The source of synchronizing signals or impulses for controlling the discharge of the sweep condensers may be located at a transmitter station or may be local to the circuit controlled by it and may take any of a variety of well-known forms. For example, if the circuit now being described were used in connection with a cathode ray tube at a television receiving station, and a scanning disc were used to generate the image and synchronizing signals, the arrangement for generating the synchronizing signals similar to the one described in Patent 2,050,363, August 11, 1936 to E. R. Morton may be used. Or, if a cathode ray tube is used at the television transmitting station, pulses, generated by the beam, or otherwise, before or after or during the return of the beam after its maximum horizontal and also after its maximum vertical deflection, assuming horizontal line scanning, may for example be used to generate the synchronizing signals for the corresponding sweep circuits at the receiving station.

When a scanning disc is used to generate the synchronizing signals or impulses, the transformer 22 is preferably of the type which is generally known as an impulse transformer. This transformer has a high permeability core 29 of very small cross-sectional area. The purpose of the impulse transformer is to generate sharp voltage pulses in order to discharge the gas-filled grid-controlled electron discharge devices at the correct times. By this means, random variations in wave amplitude between successive cycles of the synchronizing signals caused by imperfections in the signal generating means are reduced. When an approximately sinusoidal current is passed through the primary winding 21 of the impulse transformer 22, the flux through the core 29 changes slowly during most of the cycle due to saturation but it changes very rapidly when the current is reversed. This rapid change in flux produces a sharp voltage pulse across the secondary windings 23 and 24 which has more nearly the desired relation to the position of the scanning aperture in each successive cycle of the synchronizing signals or impulses than the voltages obtained from an ordinary transformer would have. For a more complete description of impulse transformers per se, of the type just mentioned, reference may be made to Patent 1,936,153 to E. T. Burton, issued November 21, 1933.

The gas-filled grid-controlled electron discharge devices $T_1$ and $T_2$ are preferably of the three-electrode hot-cathode type generally known as "thyratrons" comprising respectively a suitable envelope enclosing a cathode 30, an anode 31 and a grid 25 for $T_1$ and a cathode 32, an anode 33, and a grid 26 for $T_2$. Suitable sources of direct current biasing potential, such as batteries 34 and 35, complete the grid circuits of the tubes $T_1$ and $T_2$, respectively, and resistances 36 and 37 are placed in the plate circuits of the tubes $T_1$ and $T_2$, respectively, in order to limit the peak discharge current through these tubes. The plate circuits of the tubes $T_1$ and $T_2$ are connected in a series circuit starting with resistance 36 and thence through the sweep condensers 10 and 11, the discharge path of tube $T_2$, the resistance 37, the sources of direct current 15 and 17, and the discharge path of tube $T_1$ back to the resistance 36. Condensers 50 and 51 are connected in shunt with the sources 15 and 17, respectively, to bypass the current changes around these sources, although these condensers are not essential. Where each source is a rectifier and filter, the filter circuit usually includes a condenser so no additional condenser is required. Even if batteries are used, the condensers are not absolutely necessary but their use is advisable. By means of this arrangement the voltage difference between points X and Y caused by the charge on condensers 10 and 11 is dissipated between the tubes $T_1$ and $T_2$ in series rather than through either of these two alone, thus allowing a higher voltage sweep circuit than would be possible with one gas-filled grid-controlled tube acting alone to remove the charge on the condensers 10 and 11.

When the cathode of the tube $T_1$ is connected to the negative side of the source of potential 17 and the anode of the tube $T_2$ is connected through the resistance 37 to the positive side of the source of potential 15, when discharges occur in the tubes $T_1$ and $T_2$, the potential of the point X is brought suddenly to approximately the potential represented by the point B, Fig. 3, while the potential of the point Y is brought suddenly to the potential indicated by the point A. Stated differently, the potential of the point X which was $+E_0$ suddenly passes through zero and becomes $-E_0$ and the potential of the point Y which was $-E_0$ suddenly passes through zero and becomes $+E_0$. The cycle begins again and the potential of point X is slowly and linearly caused to change its potential from $-E_0$ (point B, Fig. 3) to $+E_0$ (point C, in Fig. 3). Similarly, the potential of point Y slowly and linearly changes its potential from $+E_0$ (point A) to $-E_0$ (point D). These variations in potential of the points X and Y may be compared with the variations in potential shown in Fig. 2, this figure representing variations in sweep potential of a circuit of the type disclosed in the above-mentioned Norton Patent No. 2,180,365. In the arrangement shown in this figure, a point in the Norton circuit corresponding to the point X in Fig. 1 would vary in potential from zero to a positive value designated as $A_1$ and be suddenly reduced to zero at point $F_1$, at which point the cycle would start again, after which the potential of this point would slowly and linearly attain the potential $C_1$. The charges would then be quickly removed again and the cycle of slow increases in potential and abrupt decreases would take place cyclically. In order to make the change in voltage across the condenser corresponding to condenser 10 equal to $2E_0$ as in the case of the sweep circuit of this application, it would be necessary for the voltage of the charging battery to be approximately twice that of the source used in the sweep circuit of this invention.

Referring again to Fig. 2, in a circuit of the type of that disclosed in the Norton Patent No. 2,180,365, the potential of a point corresponding to the point Y in Fig. 1 would change from zero to $-2E_0$ represented by point $B_1$, return to zero at point $F_1$ suddenly upon the application of an impulse, and then return slowly to a potential of $-2E_0$ at point $D_1$.

It will be noted, therefore, in comparing the sweep voltages represented by Fig. 2 and Fig. 3, that due to the fact that the potentials of the points X and Y in the circuit of this invention swing from one side of the reference potential to an equal value on the other, which value is determined by the voltage source, the difference from the reference potential at the point of maximum charge in the cycle is required to be only one-half what it was in the Norton circuit to produce exactly the same amount of voltage swing.

A further advantage of this circuit is that the coupling condensers which are used in the Norton circuit to allow the potential of each sweep plate to swing to potentials on each side of the reference point are not necessary inasmuch as the potentials generated at the points X and Y swing in the manner desired. Thus, the external or outside terminals of the condensers 10 and 11 may be connected directly to the deflecting plates 40 and 41 of the cathode ray tube 14.

The complete operation of the circuit shown in Fig. 1 is as follows: Let it be assumed that condensers 10 and 11 are fully discharged and the starting point of the cycle is at point E in Fig. 3. From this point condensers 10 and 11 are slowly charged at a substantially linear rate by means of the potential sources 15 and 17 and the constant current devices 16 and 18. Point X thus attains a potential $E_0$ at point A and point Y attains a potential $-E_0$ at point B which potential is substantially equal and opposite to that of X, the common terminal potential being the reference potential. The sweep plates 40 and 41 being directly connected to the points X and Y, of course follow the potentials of these points exactly. At periodic intervals, as for example at the end of each scanning line in the situation where the sweep circuit is used for horizontal scanning, a synchronizing signal or pulse is generated by the source 20 and caused to energize the primary winding 21 of the transformer 22. Because of the high permeability of the core 29 and the restricted cross-section thereof sharp voltage pulses are induced in the secondary windings 23 and 24 the positive portions of which are sufficient to overcome the negative bias on the tubes $T_1$ and $T_2$, causing these tubes to discharge the condensers 10 and 11 simultaneously and immediately and suddenly charge them in the opposite direction. This quickly brings the anode of each of the gas-filled tubes $T_1$ and $T_2$ to a potential with respect to its respective cathode which is below the potential sufficient to maintain ionization in these tubes and they become non-conducting. The condensers 10 and 11 are then linearly discharged through the constant current devices 16 and 18, respectively, until the potentials of X and Y reach zero. Continuing the cycle, the condensers 10 and 11 are then linearly charged through these constant current devices until the potentials of X and Y reach $+E_0$ and $-E_0$, respectively, as in the first stage described above. The cycle of charge and discharge of the condensers 10 and 11 produces across the points X and Y a saw-tooth voltage wave at the periodicity of the effective synchronizing pulses, which wave is directly applied across the plates 40 and 41. The potentials applied to the plates are balanced with respect to the potential of the anode 13 thus eliminating any loss of focus and distortion which would have resulted had the sweep circuit been unbalanced.

While this invention has been illustrated and described as a circuit for causing the potentials to be balanced with respect to the potential of an anode of a cathode ray tube which is placed at ground potential (the potential of the common terminal of the two sweep condensers), it is obvious that the invention is applicable also where the anode is placed at a potential above ground as, for example, 5000 volts. In such a situation, the common terminal may be placed at this potential above ground in which case direct coupling is used as is shown in Fig. 1. Alternately, the common terminal is left at ground potential and coupling condensers of the order of 0.1 mfd. for a 24 cycle frequency are used between the points X and 40 and the points Y and 41 respectively to insulate the low voltage sweep circuit from the high voltage of the deflecting plates. A coupling resistance of the order of 20 megohms is then also connected between the plates, the midpoint of which is connected to the anode, to fix the direct current potential of the deflecting plates with respect to that of the anode. In order to make the drop across the coupling resistance as small as possible so as not to disturb the linearity of the sweep, coupling condensers of very high leakage resistance compared with the coupling resistance are used. In general, it is preferred that the leakage resistance of the coupling condensers be much higher than the leakage resistance of the sweep condensers (although this, too, should be high). The total leakage resistance of each sweep condenser and the corresponding coupling condenser should be at least as high as 100 megohms and is preferably 20,000 or 30,000 megohms. In order to have a substantially linear sweep voltage, the product of the capacity of one coupling condenser in farads and the resistance of one half the coupling resistance should be from fifty to one hundred times the time required to make a complete sweep. For a circuit in which coupling condensers and resistances are used to connect a sweep circuit to a pair of deflecting plates in a cathode ray tube, reference may be made to Patent 2,178,464, issued October 31, 1939 to M. W. Baldwin, Jr.

Various other modifications may be made without departing from the spirit of the invention. While the invention pertains primarily to sweep circuits for cathode beams in television systems, it may obviously find other uses. This is especially true of some of the various aspects of the invention, as will be apparent from consideration of the appended claims defining the invention in its different aspects.

What is claimed is:

1. The combination with a condenser, of means including a source of continuously direct potential for slowly discharging a charge on said condenser and immediately slowly charging it in the reverse direction, means including a second source of continuously direct potential for then quickly discharging it and reversely charging it with current from said second source, and means for maintaining one terminal of said condenser at a fixed potential at all times.

2. In combination, a cathode ray tube having an anode and a pair of deflecting plates, a pair of condensers having a common terminal and each of said condensers having an outside terminal, means for directly connecting the common terminal of said condensers to said anode, means for connecting the outside terminals of said condensers directly and conductively to the respective plates of said pair of deflecting plates to maintain said outside terminals at the potentials of said respective plates, and means for cyclically varying the charge across each of said condensers, first in one direction and then in the other, whereby the potential of each of said deflecting plates cyclically varies from a potential which is negative with respect to the potential of said anode to a potential which is positive with respect thereto.

3. In combination, two condensers having a common terminal and each having an outside terminal, means for charging said condensers so that the potentials of the outside terminals are substantially equal in magnitude and opposite in sign, the potential of the common terminal being the reference potential, and means for discharging and recharging said condensers to such a point that the potentials of the outside terminals reach values on opposite sides of the reference potential from the potentials they attained during the charging operation.

4. In combination, a condenser, means for placing one terminal of said condenser at a fixed potential, means including a source of continuously direct potential for charging said condenser with current from said source, and means including a second source of continuously direct potential for discharging said condenser with current from said second source and recharging it to such a point that the potential of the terminal which is not at a fixed potential reaches a value on the opposite side of the reference potential from the potential attained during the charging operation.

5. In combination, a condenser, means for placing one terminal of said condenser at a fixed potential, means including a source of continuously direct potential for charging said condenser with current from said source, and means including a second source of continuously direct potential for discharging said condenser and recharging it with current from said second source to such a point that the potential of the terminal which is not at a fixed potential reaches a value on the opposite side of the reference potential from the potential attained during the charging operation, said means for discharging and recharging said condenser with current from said second source including an electron discharge device.

6. In combination, a condenser, means for placing one terminal of said condenser at a fixed potential, means including a source of continuously direct potential for charging said condenser with current from said source, and means including a second source of continuously direct potential for discharging said condenser and recharging it with current from said second source to such a point that the potential of the terminal which is not at a fixed potential reaches a value on the opposite side of the reference potential from the potential attained during the charging operation, said means for discharging and recharging said condenser with current from said second source including a gas-filled electron discharge device.

7. In combination, a condenser, means for placing one terminal of said condenser at a fixed potential, means including a source of continuously direct potential for charging said condenser with current from said source, and means including a second source of continuously direct potential for discharging said condenser and recharging it with current from said second source to such a point that the potential of the terminal which is not at a fixed potential reaches a value on the opposite side of the reference potential from the potential attained during the charging operation, said means for discharging and recharging said condenser with current from said second source including a gas-filled, grid-controlled electron discharge device.

8. A sweep circuit comprising two condensers having a common terminal and each having an outside terminal, means including two sources of potential and two constant current devices for charging said condensers substantially linearly with respect to time so that the potentials of the outside terminals are substantially equal in magnitude and opposite in sign, the potential of the common terminal being the reference point, and means including two gas-filled grid-controlled electron discharge devices and said two sources of potential for discharging and recharging said condenser to such a point that the potentials of the outside terminals reach values on opposite sides of the reference potential from the potentials they attained during the charging operation.

9. A sweep circuit comprising a pair of condensers connected in series, the common terminal of which is connected to ground, a constant current device and a source of potential connected between the outside terminal of each condenser and the common terminal, two gas-filled grid-controlled electron discharge devices having input and output circuits, a transformer having a primary winding and two secondary windings, means for connecting the secondary windings of said transformer respectively to the input circuits of said gas-filled grid-controlled electron discharge devices, and means for connecting the output circuits of said electron discharge devices in a series circuit including said two condensers and said two sources of potential.

10. Means for producing an alternating potential from a direct potential comprising a source of direct potential, two condensers in a series circuit, and means for alternately and intermittently connecting said source to said circuit and connecting each of said condensers to a portion only of said source in reverse direction.

11. The combination with a pair of condensers having a common terminal, each of said condensers having an outside terminal, of means for maintaining the potential of said common terminal fixed and for cyclically varying the charge across each of said condensers, first in one direction and then in the other with respect to said fixed potential, a cathode ray tube having an anode and a pair of deflecting plates, and coupling means between said condensers and said tube for, at all times, causing said anode to have the same potential as said midpoint and said deflecting plates to have respectively the same potentials as said outside terminals.

12. The combination with a condenser, of means for slowly charging and immediately rapidly discharging said condenser, then rapidly reversely charging and immediately slowly discharging said condenser, said means comprising a source of continuously direct potential continuously conductively connected to said condenser, a second source of continuously direct potential, and means for intermittently connecting said second source in series with said condenser to permit current to flow from said second source to said condenser.

13. The combination with a condenser, of means for slowly charging and immediately rapidly discharging said condenser, then rapidly reversely charging and immediately slowly discharging said condenser, said means comprising a source of continuously direct potential continuously conductively connected to said condenser, a second source of continuously direct potential, means for intermittently connecting said second source in series with said condenser to permit current to flow from said second source to said condenser, and means including a source of periodically varying potential for controlling said means for connecting said second source of continuously direct potential in circuit with said condenser.

14. The combination with a condenser, of two parallel circuits connected to the terminals thereof, a source of continuously direct potential in each of said circuits, said potentials being poled in opposite directions with respect to the terminals of the condenser, and means in one of said circuits for effectively periodically rendering said circuit alternately conductive and non-conductive.

15. The combination with a condenser, of two parallel circuits connected to the terminals thereof, a source of continuously direct potential in each of said circuits, said potentials being poled in opposite directions with respect to the terminals of the condenser, and means in one of said circuits for effectively periodically rendering said circuits alternatively conductive and non-conductive, both of said circuits being non-reactive.

16. In combination, a condenser, means for placing one terminal of said condenser at a fixed potential, means including a source of continuously direct potential for charging said condenser with current from said source, said condenser charging means including an impedance element for controlling the rate of current flow from said source to said condenser, and means including a second source of continuously direct potential for discharging said condenser and recharging it with current from said second source to such a point that the potential of the terminal which is not at a fixed potential reaches a value on the opposite side of the reference potential from the potential attained during the charging operation, said last-mentioned means including a second impedance element in series with said second source and said condenser, and means for periodically alternately raising the impedance of said second impedance element to substantially block the flow of current therethrough and reducing it to permit the flow of current therethrough.

MILLARD W. BALDWIN, Jr.